3,096,356
NEW AROMATIC AMINES AND PROCESSES
FOR THEIR PREPARATION
Marcel Jirou, Sotteville-les-Rouen, and Jean-Marie Frey, Les Authieux sur le Port St.-Ouen, Oissel, France, assignors to Compagnie Française des Matieres Colorantes, Paris, France, a French company
No Drawing. Filed Dec. 13, 1957, Ser. No. 702,497
Claims priority, application France Dec. 14, 1956
4 Claims. (Cl. 260—397.7)

The present invention relates to new aromatic amines and processes for their preparation.

According to the present invention amines are provided having the general formula:

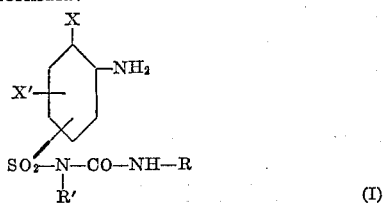

(I)

in which R represents a hydrogen atom or an alkyl, cycloalkyl, aryl or aralkyl group, R' represents a hydrogen atom or an alkyl or aryl group, X represents a group capable of taking part in the formation of a metalliferous complex and X' represents a hydrogen atom or any non-ionic substituent.

Among the groups capable of taking part in the formation of a metalliferous complex there may be mentioned for example the —OH, —COOH, —OCH$_3$, —O—CH$_2$—COOH and —S—CH$_2$—COOH groups. Halogen atoms and the alkyl, alkoxy, cyano, nitro and acylamino groups may be mentioned as examples of non-ionic groups.

As examples of amines of the general Formula I may be cited:

3-amino-4-hydroxy-phenylsulphonyl urea,
N-(3-amino-4-hydroxy-phenylsulphonyl)-N'-methylurea,
N-(3-amino-4-hydroxy-5-nitro-phenylsulphonyl)-N'-methylurea,
N-(3-amino-4-hydroxy-phenylsulphonyl)-N'-ethylurea,
N-(3-amino-4-hydroxy-phenylsulphonyl)-N'-phenylurea,
N-(3-amino-4-methoxy-phenylsulphonyl)-N'-ethylurea,
N-(3-hydroxy-4-amino-phenylsulphonyl)-N'-ethylurea,
N-(3-hydroxy-4-amino-6-chloro-phenylsulphonyl)-N'-ethylurea,
N-(3-hydroxy-4-amino-6-chloro-phenylsulphonyl)-N'-phenylurea,
N-(3-hydroxy-4-amino-6-methyl-phenylsulphonyl)-N'-ethylurea,
N-(3-methoxy-4-amino-6-methyl-phenylsulphonyl)-N'-ethylurea,
N-(3:6-dimethoxy-4-aminophenylsulphonyl)-N'-ethylurea,
N-(2-hydroxy-3-amino-5-nitro-phenylsulphonyl)-N'-ethylurea.

According to the present invention, the compounds of general Formula I can be obtained for example by condensation of a compound of the general formula

R—N=C=O (II)

with a sulphonamide of one of the following general formulae

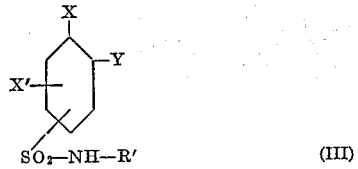

(III)

or

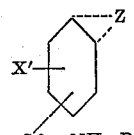

(IV)

in which formulae R, R', X, and X' have the same significance as above, Y represents a group capable of giving rise to an amino group, and Z represents a ring capable of simultaneously producing, on saponification, a hydroxy group and an amino group in the ortho position with respect to each other. After condensation, the group Y is converted into an amino group or the ring Z is saponified.

Groups capable of giving rise to an amino group are, for example, acylamino, phenylsulphonylamino and tolylsulphonylamino groups. Rings capable of giving rise to hydroxy and amino groups in the ortho position with respect to each other are, for example, the oxazolone and methyloxazole rings. These groups and rings are transformable by alkaline or acid hydrolysis. The nitro group is another example of a group capable of giving rise to an amino group and may be converted into the latter group by reduction.

A variation of the process consists in using derivatives of Formula III, in which Y represents a halogen atom, and, after condensation, carrying out amination of the compound obtained.

The condensation is preferably effected by condensing an isocyanate with a sulphonamide in solution in a mixture of caustic soda and acetone at a temperature between —10° C. and +30° C. Any other non-hydroxylated solvent neutral to the isocyanate may be used in the condensation. The condensation may be carried out with or without the use of a catalyst such as for example pyridine, triethylamine, trimethylamine, zinc oxide, lime or calcium carbonate. Nevertheless, the reaction can only be effected if the amino group is protected, for example by an acyl, phenylsulphonyl or tolylsulphonyl group, or by an oxazolone or methyloxazole ring in the case when X represents a hydroxyl group. These derivatives may then be hydrolysed by alkaline or acid means without affecting the sulphonyl-urea group, the aromatic base thus being liberated.

Another process for the preparation of compounds of general Formula I consists in starting from nitro derivatives and, after condensation, reducing the nitro groups to amino groups. The corresponding halogen derivatives may also be used and in this case, after condensation, an amination is carried out.

The novel aromatic amines of the present invention are diazotisable by the usual methods of diazotisation. They are in general fairly soluble in water, soluble in dilute acids, in alkalis and in sodium carbonate. They are valuable intermediates in the synthesis of metallisable and metalliferous azo dyestuffs.

The invention will be more clearly understood by reference to the following examples which are purely illustrative and in which the parts are parts by weight except when the contrary is stated.

*Example 1*

21.9 parts of 2-nitro-4-sulphonamide-phenol are dissolved in 100 parts by volume of 2 N caustic soda and 50 parts by volume of acetone. The solution, cooled to +10° C. and mechanically agitated, is treated at between 10° C. and 15° C. with 7.3 parts of ethyl isocyanate over a period of time of 15 minutes. When the condensation is finished, the solution is acidified by means of 36 parts of 30% acetic acid, the precipitate of N-(3-nitro-4-hydroxy-phenylsulphonyl)-N'-ethylurea is drained, washed with 200 parts of water and dried in an oven. In the pure state, it is in the form of fine, pale-yellow needles, whose melting point is 240–241° C. (Maquenne block).

The reduction of this nitro product is effected by sodium sulphide in aqueous solution: 72 parts of sodium sulphide ($Na_2S$, $9H_2O$) are dissolved in 60 parts of water at 85° C. and 28.9 parts of N-(3-nitro-4-hydroxy-phenyl-sulphonyl)-N'-ethylurea are introduced between 80° C. and 85° C. over a period of time of 30 minutes. The mixture is agitated again for an hour at 80° C., acidified by addition of 65 parts of concentrated hydrochloric acid, and the precipitate of sulphur is filtered off in the hot. The filtrate is neutralised to pH 6.5 by the addition of 12 parts of sodium carbonate and the precipitate of N-(3-amino-4-hydroxy-phenylsulphonyl)-N'-ethylurea obtained is drained and washed with 30 parts of ice water. The product is then dried in an oven. In appearance it is a rose-coloured powder and when recrystallised from water it has a melting point of 168–169° C. (Maquenne block). The corresponding hydrochloride melts at 204–205° C. with decomposition.

The free dried base can be recrystallised from ethyl acetate, with which it forms a well-defined solvate in the molecular ratio of 3:1, having a melting point of 106–107° C. (Maquenne block).

Analysis:

|  | Found | Calculated for $C_9H_{13}O_4N_3S$ $\frac{1}{3}CH_3COOC_2H_5$ |
|---|---|---|
| C, percent | 42.9 | 43.0 |
| H, percent | 4.7 | 4.8 |
| N, percent | 14.5 | 14.6 |
| S, percent | 11.2 | 11.1 |

*Example 2*

22.8 parts of 5-methyl-6-sulphonamido-benzoxazolone, obtained by phosgenation of the corresponding o-aminophenol, are dissolved in 100 parts by volume of 2 N caustic soda mixed with 100 parts by volume of acetone. The solution is cooled to 10° C. and 8.1 parts of ethyl isocyanate are added over a period of time of 15 minutes at a temperature between 10° C. and 15° C. After stirring for an hour at 10° C., acetic acid is added and the 5-methyl-6-N'-ethylurea-N-sulphonyl-benzoxazolone is filtered off and washed with water. In the pure dry state this is in the form of very small white needles having a melting point of 267–268° C. (Maquenne block).

The hydrolysis, which brings about the opening of the oxazolone ring, is effected by dissolving 27.3 parts of 5-methyl-6-N'-ethylurea-N-sulphonyl-benzoxazolone in 70 parts of water and 48 parts by volume of 10 N caustic soda, and gently refluxing the solution for 2 hours. After neutralising the solution with about 60 parts of concentrated hydrochloric acid, a precipitate of N-(3-hydroxy-4-amino-6-methyl-phenyl-sulphonyl)-N'-ethylurea in the free state is obtained. When recrystallised from a large volume of water, this new base is present in the form of long white needles, crystallizing with half a molecule of water, and with melting point 148–150° C. (cloudy fusion).

Analysis:

|  | Found | Calculated for $C_{10}H_{15}O_4N_3S$ $\frac{1}{2}H_2O$ |
|---|---|---|
| C, percent | 42.7 | 42.5 |
| H, percent | 5.4 | 5.6 |
| N, percent | 15.0 | 14.9 |
| S, percent | 11.3 | 11.3 |

*Example 3*

25.8 parts of 3-methoxy-4-acetylamino-6-methyl-sulphonamido benzene, dissolved in 100 parts by volume of N caustic soda and 50 parts by volume of acetone, are reacted at a temperature between 10° C. and 15° C., with 7.3 parts of ethyl isocyanate. After acidification and treatment as in the preceding examples, N-(3-methoxy-4-acetylamino-6-methyl-phenylsulphonyl)-N'-ethylurea is obtained. When purified in alcohol, it is in the form of white needles having a melting point of 264–265° C. (Maquenne block).

Deacetylation is effected by treating 32.9 parts of the preceding product with 150 parts by volume of 2 N caustic soda for 3 hours under reflux; the solution is neutralised with concentrated hydrochloric acid, and the precipitate of N-(3-methoxy-4-amino-6-methyl-phenylsulphonyl)-N'-ethylurea is drained and washed. In the pure state, the product appears as small white needles: its melting point is 194–195° C. (Maquenne block).

Analysis:

|  | Found | Calculated for $C_{11}H_{17}O_4N_3S$ |
|---|---|---|
| C, percent | 46.0 | 46.0 |
| H, percent | 5.7 | 5.9 |
| N, percent | 14.7 | 14.6 |
| S, percent | 11.0 | 11.1 |

We claim:
1. A compound of the formula

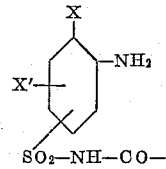

$$SO_2-NH-CO-NH-R$$

in which R represents a member selected from the group consisting of methyl, ethyl and phenyl, X represents a member selected from the group consisting of —OH and —OCH$_3$, X' represents a member selected from the group consisting of hydrogen, chlorine, nitro, methyl and methoxy.

2. N-(3-amino-4-hydroxy-phenylsulphonyl)-N'-ethylurea.

3. N-(3-hydroxy-4-amino-6-methyl-phenylsulphonyl)-N'-ethylurea.

4. N-(3-methoxy-4-amino-6-methyl-phenylsulphonyl)-N'-ethylurea.

References Cited in the file of this patent

UNITED STATES PATENTS 2,371,178    Martin _____ Mar. 13, 1945

FOREIGN PATENTS

F18136    Germany _____ Sept. 27, 1956
F18648    Germany _____ Dec. 13, 1956
F18659    Germany _____ Dec. 27, 1956
1,003,716    Germany _____ Mar. 7, 1957

OTHER REFERENCES

Bergmann: The Chemistry of Acetylene and Related Compounds, p. 80 (1948).

Mirsky: Yearbook of Endocrinology, 1955/1956, pages 298–301.

Erhart: Naturwissenschaften, vol. 43, page 93 (February 1956).

Dorfmuller: Deut. Med. Wochenschrift, vol. 81, page 888 (1956).

Maske: Deut. Med. Wochenschrift, vol. 81, pp. 823–5 (May 25, 1956).